United States Patent
Gough

[11] 3,725,511
[45] Apr. 3, 1973

[54] 1-(2-CYANOETHOXY)-2,2-DICHLOROVINYL PHOSPHATE ESTERS

[75] Inventor: Stanley T. D. Gough, Branchburg, N.J.

[73] Assignee: Mobil Oil Corporation, New York, N.Y.

[22] Filed: Apr. 13, 1970

[21] Appl. No.: 27,993

[52] U.S. Cl..................................260/940, 424/210
[51] Int. Cl................................A01n 9/36, C07f 9/08
[58] Field of Search......................................260/940

[56] References Cited

UNITED STATES PATENTS 3,324,203    6/1967    Weesner..............................260/940

*Primary Examiner*—Lewis Gotts
*Assistant Examiner*—Richard L. Raymond
*Attorney*—Oswald G. Hayes, Andrew L. Gaboriault, Mitchell G. Condos and Hastings S. Trigg

[57] ABSTRACT

Compound having the formula:

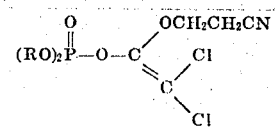

wherein R is alkyl ($C_1$–$C_4$), haloalkyl ($C_1$–$C_4$), alkenyl ($C_2$–$C_4$), phenyl, alkylphenyl, or halophenyl, are new compounds that are useful as insecticides.

3 Claims, No Drawings

1-(2-CYANOETHOXY)-2,2-DICHLOROVINYL PHOSPHATE ESTERS

BACKGROUND OF THE INVENTION

1. Field of the Invention

This invention is directed to novel dichlorovinyl phosphates having a cyanoethoxy substituent and their use as insecticides.

2. DESCRIPTION OF THE PRIOR ART

The compounds most closely related to the compounds of this invention are disclosed in U.S. Pat. No. 3,324,203 as nematocides. They have the formula:

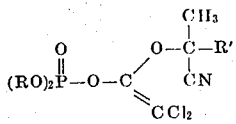

wherein R' is long chain alkyl. Insofar as is now known, the compounds of this invention have not been disclosed in the literature.

SUMMARY OF THE INVENTION

This invention provides compounds having the formula:

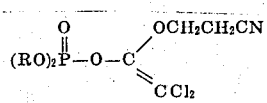

wherein R is alkyl ($C_1$–$C_4$), haloalkyl ($C_1$–$C_4$), alkenyl ($C_2$–$C_4$), phenyl, alkylphenyl, or halophenyl. It also provides their use in combatting insects and insecticidal compositions comprising these compounds and a carrier therefor.

DESCRIPTION OF SPECIFIC EMBODIMENTS

Non-limiting examples of the compounds of this invention are:
dimethyl 1-(2-cyanoethoxy)-2,2-dichlorovinyl phosphate;
diethyl 1-(2-cyanoethoxy)-2,2-dichlorovinyl phosphate;
diisobutyl 1-(2-cyanoethoxy)-2,2-dichlorovinyl phosphate;
diallyl 1-(2-cyanoethoxy)-2,2-dichlorovinyl phosphate;
diphenyl 1-(2-cyanoethoxy)-2,2-dichlorovinyl phosphate;
di-p-chlorophenyl 1-(2-cyanoethoxy)-2,2-dichlorovinyl phosphate;
di-m-bromophenyl 1-(2-cyanoethoxy)-2,2-dichlorovinyl phosphate;
ditolylphenyl 1-(2-cyanoethoxy)-2,2-dichlorovinyl phosphate;
dixylylphenyl 1-(2-cyanoethoxy)-2,2-dichlorovinyl phosphate; and
methyl p-nitrophenyl 1-(2-cyanoethoxy)-2,2-dichlorovinyl phosphate.

The compounds of this invention are readily prepared by reacting 2-cyanoethyl trichloroacetate with a phosphite, e.g. trialkyl phosphite, alkyl diaryl phosphite, etc. These phosphites are prepared, as is well known in the art, by reacting phosphorus trichloride with the hydroxy derivative (e.g. an alcohol) of the desired ester substituent in the presence of a HCl acceptor, such as pyridine or other organic base. The preparation of the compounds of this invention is demonstrated in the following illustrative examples.

EXAMPLE 1

Preparation of 2-Cyanoethyl Trichloroacetate

Trichloroacetyl chloride (18.0 g) was added dropwise to a solution of hydracrylonitrile (7.1 g) and triethylamine (10.1 g) in ether (250 ml) at 0°C. The mixture was stirred overnight at room temperature, then filtered and the solvent evaporated to give the product as an oil, 11.7 g.

EXAMPLE 2

Dimethyl 1-(2-Cyanoethoxy)-2,2-dichlorovinyl Phosphate

The ester of Example 1 (4.3 g) was dissolved in benzene (75 ml), and trimethyl phosphite (2.5 g) in benzene (10 ml) added. The resulting solution was refluxed overnight, then evaporated to give the product (5.2 g), for which the structure was confirmed by NMR [doublet at 6.1 τ, J=12 cps ($POCH_3$), triplet at 7.18 τ, J=6 cps ($OCH_2CH_2CN$), triplet at 5.68 τ, J=6 cps ($OCH_2CH_2CN$)]. The integration of the NMR spectrum was commensurate with the assigned structure.

EXAMPLE 3

Diethyl 1-(2-Cyanoethoxy)-2,2-dichlorovinyl Phosphate

The same reaction as in Example 2, but using triethyl phosphite (3.3 g) in place of trimethyl phosphite, gave the diethyl ester, for which the structure was confirmed by NMR [triplet at 8.6 τ, J=7 cps ($POCH_2CH_3$), triplet at 7.18 τ, J=6 cps ($CH_2CN$), multiplet at 5.7 τ, P-$OCH_2CH_3$ and $-O-CH_2-CH_2CN$)]. The integration of the MNR spectrum was commensurate with the assigned structure.

INSECTICIDE TESTING METHODS

DIP TESTS

MEXICAN BEAN BEETLE - Epilachna varivestis Mulsant (MB)

Lima bean leaves of uniform size are momentarily dipped in a 500 ppm. water-acetone solution of the test compound. When dry, the treated leaf is placed in a screened petri dish and exposed to 10 fourth instar larvae. The percent mortality is recorded after 48 hours. Compounds that show 90 percent or more mortality are retested at 100 and 10 ppm.

TWO-SPOTTED SPIDER MITE - Tetranychus telarius Linnaeus (SM)

Infested trifoliate bean leaves (Henderson bush lima) are selected that have as many as twenty adult mites per leaf. Leaves with mites attached are momentarily dipped into a 500 ppm. emulsion, solution, or suspension of the test compound and then placed (petiole only) in a 4 oz. bottle of water for observation. Per cent mortality is observed after 72 hours. If 90–100 percent mortality is observed, compounds are retested at 100 and 10 ppm.

SPRAY TESTS

HOUSEFLY - Musca domestica Linnaeus (HF)

Adult houseflies are contained in 100 mm. petri dish screened cages and exposed to a spray of 10 ml. acetone solution of test compound. An initial concentration of 500 ppm is used, with 10 flies in each cage. Percent mortality is observed after 24 hours. When over 90 percent mortality is observed, the compound is retested at lower concentrations.

GERMAN COCKROACH - Blattella germanica Linnaeus (GC)

This test is conducted in a manner similar to that used for the housefly. The test specimens are 10 cockroaches per screened petri dish.

BEAN APHID - Aphis fabae (BA)

This test is conducted in a manner similar to that used for the housefly. The test specimens are Nasturtium leaves infested with bean aphids.

BOLL WEEVIL - Anthonomus Grandis (BW)

This test is conducted in a manner similar to that used for the housefly. The test specimens are 10 boll weevils per screened petri dish.

TWO-SPOTTED SPIDER MITE - Systemic (S/SM)

Young lima bean seedlings are placed in test tubes containing 50 ppm. solutions of test material. After 72 hours, mites are introduced by placing inverted mite-infested leaves on the test plants. Mortality is recorded 72 hours after the seedlings are mite infested. Compounds active at 50 ppm. are retested at lower concentrations of 10 and 1 ppm.

The compounds of Examples 2 and 3 were subjected to these insecticidal tests. The results (per cent control) are set forth in the Table.

TABLE

| ppm | MB | SM | HF | BA | BW | S/SM* | GC |
|---|---|---|---|---|---|---|---|
| Compound of Example 2 | | | | | | | |
| 500 | 100 | 80 | 90 | 90 | 100 | 0 | 100 |
| 100 | 90 | 30 | 30 | 90 | 20 | | 80 |
| 10 | 20 | | 0 | 20 | 0 | | 0 |
| Compound of Example 3 | | | | | | | |
| 500 | 100 | 100 | 100 | 100 | 90 | 60 | 100 |
| 100 | 100 | 90 | 70 | 100 | 0 | 0 | 60 |
| 10 | 100 | 40 | | 90 | | | |

\* Tested at 50 and 10 ppm.

Although the present invention has been described with preferred embodiments, it is to be understood that modifications and variations may be resorted to without departing from the spirit and scope of this invention, as those skilled in the art will readily understand. Such variations and modifications are considered to be within the purview and scope of the appended claims.

WHAT IS CLAIMED IS:

1. Compounds having the formula:

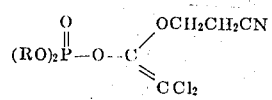

wherein R is alkyl ($C_1$-$C_4$), haloalkyl ($C_1$-$C_4$) alkenyl ($C_2$-$C_4$), phenyl, alkylphenyl, or halophenyl.

2. A compound of claim 1, wherein said compound is dimethyl 1-(2-cyanoethoxy)-2,2-dichlorovinyl phosphate.

3. A compound of claim 1, wherein said compound is diethyl 1-(2-cyanoethoxy)-2,2-dichlorovinyl phosphate.

* * * * *